(12) United States Patent
Mäkelä et al.

(10) Patent No.: US 7,302,274 B2
(45) Date of Patent: Nov. 27, 2007

(54) METHOD AND DEVICE FOR REAL-TIME SHARED EDITING MOBILE VIDEO

(75) Inventors: Jakke Mäkelä, Turku (FI); Kai Ojala, Oulu (FI); Timo Tokkonen, Oulu (FI); Mika Mustonen, Ii (FI)

(73) Assignee: Nokia Corporation, Espoo (FI)

( * ) Notice: Subject to any disclaimer, the term of this patent is extended or adjusted under 35 U.S.C. 154(b) by 198 days.

(21) Appl. No.: 10/666,875

(22) Filed: Sep. 19, 2003

(65) Prior Publication Data

US 2005/0064858 A1    Mar. 24, 2005

(51) Int. Cl.
*H04B 7/00* (2006.01)

(52) U.S. Cl. .................. 455/509; 455/518; 715/515

(58) Field of Classification Search .......... 455/509, 455/518; 345/762, 4, 716; 709/204, 206, 709/208; 370/401; 715/515
See application file for complete search history.

(56) References Cited

U.S. PATENT DOCUMENTS

| | | | |
|---|---|---|---|
| 5,940,769 A * | 8/1999 | Nakajima et al. .......... 455/509 |
| 6,342,906 B1 | 1/2002 | Kumar et al. ............... 345/751 |
| 6,879,997 B1* | 4/2005 | Ketola et al. ............... 709/208 |
| 2002/0146018 A1* | 10/2002 | Kailamaki et al. .......... 370/401 |
| 2004/0015548 A1* | 1/2004 | Lee ............................. 709/204 |
| 2004/0051737 A1* | 3/2004 | Lin et al. .................... 345/762 |
| 2004/0125126 A1* | 7/2004 | Egawa et al. ............... 345/716 |
| 2004/0139396 A1* | 7/2004 | Gelernter et al. ........... 715/515 |
| 2004/0203977 A1* | 10/2004 | Kennedy .................... 455/518 |
| 2004/0249899 A1* | 12/2004 | Shiigi ......................... 709/206 |
| 2005/0052341 A1* | 3/2005 | Henriksson ................... 345/4 |

* cited by examiner

*Primary Examiner*—Joseph Feild
*Assistant Examiner*—Phuoc Doan
(74) *Attorney, Agent, or Firm*—Harrington & Smith, PC (57) ABSTRACT

According to the present invention, there is provided a method and device for the viewing, editing and dissemination of an editable object in real-time mobile collaboration sessions. The invention comprises a set of mobile terminals and a protocol which enables users to simultaneously edit the same editable object. An advantageous embodiment of this invention allows for synchronization to occur in real time. Further, synchronization and version control problems are avoided as the invention considers each user's edited version to be a genuine version of the data. The end result of the editing process may be several different versions, and not just one single authoritative version.

60 Claims, 7 Drawing Sheets

Fig. 1
Wireless Communication System

Fig. 3
File format 300

Fig 5
Editing an object 500

METHOD AND DEVICE FOR REAL-TIME SHARED EDITING MOBILE VIDEO

TECHNICAL FIELD

This invention relates generally to wireless communications systems and networks and, more specifically, relates to simultaneous multi-user real-time mobile shared video editing.

BACKGROUND

Real-time collaborative tools allow a group of users to view and edit the same text/graphic/image/multimedia document at the same time from geographically distributed locations connected by communication networks, such as the Internet. With the spread of the Internet and intranets, collaboration between groups across remote sites is increasing.

Collaboration tools, or groupware, can generally be divided into asynchronous and synchronous tools. Groupware, such as email, workflow systems, group calendars, and newsgroups on a network where the data is presented to a user when explicitly requested are asynchronous tools. These asynchronous tools do not require the simultaneous presence of users in the same location at the same time. On the other hand, new sets of tools such as shared whiteboards, chat systems, and more sophisticated environments, such as internet multi-player video gaming, allow groups of users to interact simultaneously. These tools allow users and groups to work in a common work space at the same time in a synchronous, real-time fashion. Changes to the shared work space are made visible to all participants immediately.

Collaborative writing systems also may provide both real-time support and non-real-time support. Word processors, such as Microsoft Word, provide asynchronous support by showing authorship and by allowing users to track changes and make annotations to documents. Authors collaborating on a document may also be given tools to help plan and coordinate the change management process, such as methods for locking parts of the document. Synchronous collaborative writing systems allow authors to see each other's changes as they make them. These systems usually require an additional communication channel for the authors as they work, such as a video communication system or a chat system.

Currently, synchronous tools are quite restrictive in the types of data that can be shared and edited in a common work space. For example, the work space for chat programs is a common text file which serves as a conversation log. The work space for whiteboards is a shared bitmap image. If a group wishes to view and edit a slide presentation or a database in a discussion through a whiteboard, they have to share the bitmap image of the slide presentation or database and modify local copies manually in order to maintain synchrony between local copies and the image in the collaborative discussion in the whiteboard.

Prior solutions for real-time collaboration and version control systems have generally related to computer-based systems for enhancing collaboration between and among individuals who are separated by distance and/or time. The goal, in these solutions is to replicate in a computer desktop environment, the full range, level and intensity of interpersonal communication and information sharing which would occur if all the participants were together in the same room at the same time. These solutions are memory and bandwidth intensive and are not realistic nor are they applicable for mobile devices with limited memory and display areas.

SUMMARY OF THE PREFERRED EMBODIMENTS

The foregoing and other problems are overcome, and other advantages are realized, in accordance with the presently preferred embodiments of these teachings.

This invention provides effective real-time, simultaneous editing and collaboration capabilities among possibly geographically distributed mobile users for operation on, for example, video data, a video clip, or multimedia data, referred to herein generically as an editable object.

The source of the editable object can be remote (e.g. received from an image archive via the Internet), or it could be local (e.g. obtained from an image capture device or a camera that is part of a mobile terminal or that is coupled to the mobile terminal).

According to the present invention, there is provided a method and device for the viewing, editing and dissemination of an editable object during real-time mobile collaboration sessions. The invention includes a set of mobile terminals and a protocol which enables users to simultaneously edit the same editable object. An advantageous embodiment of this invention allows for synchronization to occur in real time. Further, synchronization and version control problems are avoided, as the invention considers each user's edited version to be a genuine version of the data. The end result of the editing process may be several different versions, and not just one single authoritative version.

Further, the invention provides a method to operate a set of mobile terminals, which includes storing an editable object in the mobile terminals, and simultaneously editing the editable object using at least some of the mobile terminals, where the mobile terminals that are used for editing the editable object send locally generated edit commands to other mobile terminals of the set of mobile terminals.

Additionally, the invention provides a computer program for directing a computer to execute a method that includes storing an editable object in a mobile terminal that is a member of a set of mobile terminals, editing the editable object in the mobile terminal, and transmitting edit commands to other members of the set of mobile terminals.

The invention also provides a wireless communication system that includes a set of mobile terminals, at least one of the mobile terminals having the ability to edit an editable object and transmit information that includes edit commands, via the wireless communications system, to other mobile terminals for implementing collaborative editing of the editable object or observing collaborative editing of the editable object.

At the commencement of an editing session, each mobile terminal has a copy of the editable object. Each mobile terminal also has a list of its own edit commands as well as a list of the edit commands of other users. Only the edit commands are moving on a network, preferably including at least one wireless network, that couples together the set of mobile terminals, and each user can copy another user's edit commands to his terminal if he wishes to. These edit commands can be in a compressed form to minimize bandwidth usage. Basically there is no final and official version of the editable object. Each user, by deciding which version of the editable object they wish to retain as a "final" version, controls their own version management. If the final result is agreed upon by the individual members of the group, then the final version is the same for all members of the group. If there are differences as to the contents of the "final" version, then each member of the group may have his or her own final version.

This invention decreases the amount of permanent or archival memory that is required, and may also decrease an amount of executable or working memory, as only a hard copy of the original and one edited instance thereof of the editable object need exist in the memory of any one of the mobile terminals. Further, because only edit commands are sent through the network the bandwidth usage is minimized, which is an important feature when communicating over bandwidth-limited wireless networks.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

This invention provides effective real-time, simultaneous editing and collaboration capabilities among possibly geographically distributed mobile users for operation on, for example, video data, a video clip, or multimedia data, referred to herein generically as an editable object. The source of the editable object can be remote (e.g. received from an image archive via the Internet), or it could be local (e.g. obtained from an image capture device or a camera that is part of a mobile terminal or that is coupled to the mobile terminal). Further, the invention provides a method, and computer program for directing a computer to execute the method, to operate a set of mobile terminals, which includes storing an editable object in the mobile terminals, and simultaneously editing the editable object using at last some of the mobile terminals, where the mobile terminals that are used for editing the editable object send locally generated edit commands to other mobile terminals of the set of mobile terminals.

The invention also provides a wireless communication system that includes a set of mobile terminals, at least one of the mobile terminals having the ability to edit an editable object and transmit information that includes edit commands, via the wireless communications system, to other mobile terminals for implementing collaborative editing of the editable object or observing collaborative editing of the editable object. At the commencement f an editing session, each mobile terminal has a copy of the editable object. Each mobile terminal also has a list of its own edit commands as well as a list of the edit commands of other users. Only the edit commands are moving on a network, preferably including at least one wireless network, that couples together the set of mobile terminals, and each user can copy another user's edit commands to his terminal if he wishes to. These edit commands can be in a compressed form to minimize bandwidth usage. Basically there is no final and official version of the editable object. Each user, by deciding which version of the editable object they wish to retain as a "final" version, controls their own version management. If the final result is agreed upon by the individual members of the group, then the final version is the same for all members of the group. If there are differences as to the contents of the "final" version, then each member of the group may have his or her own final version.

Figure 1:
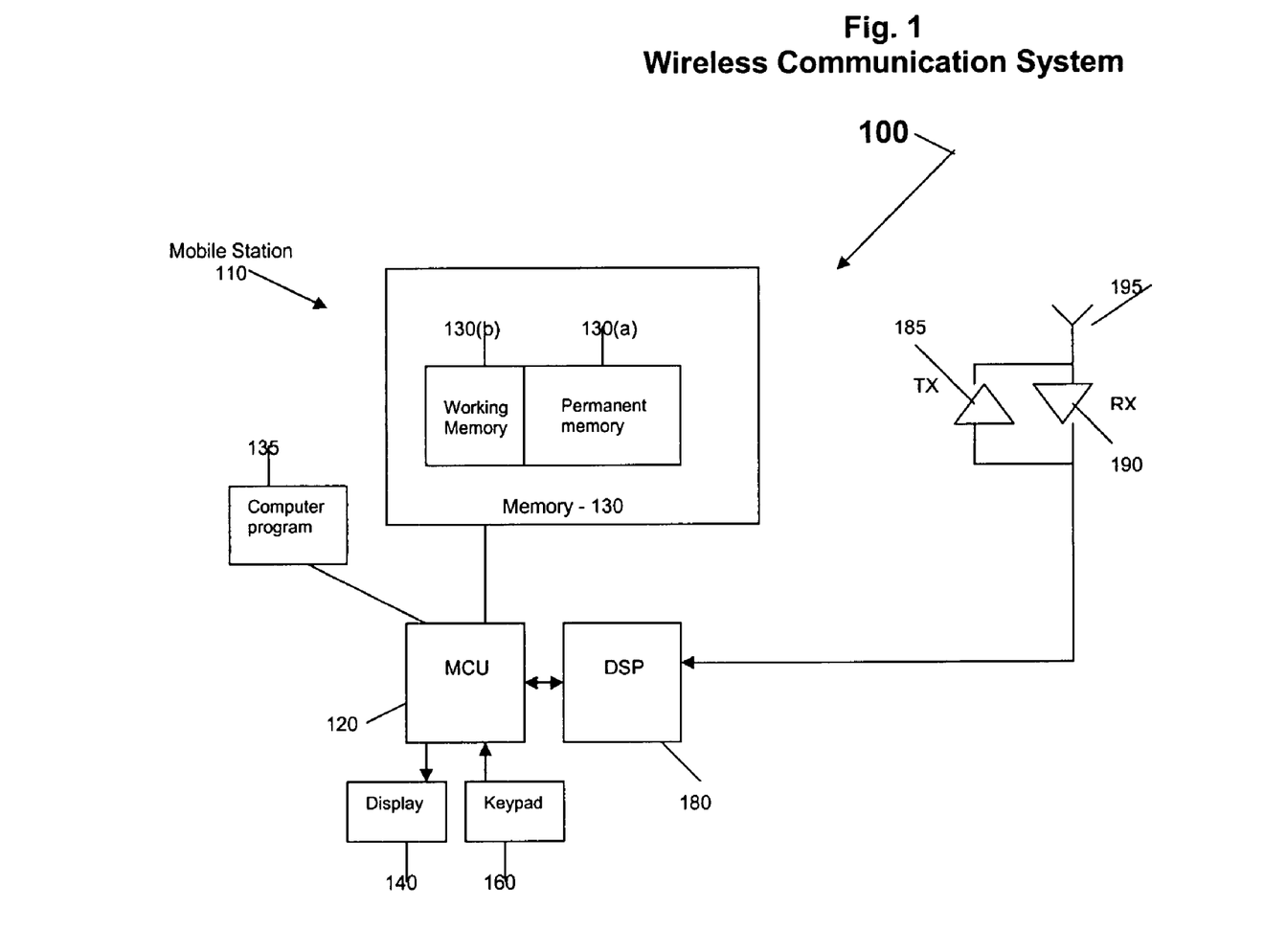
FIG. 1 is a simplified block diagram of an embodiment of a wireless communications system that is suitable for practicing this invention.

By way of introduction, and referring to FIG. 1, there is shown as a simplified block diagram an embodiment of a wireless communications system 100 that is suitable for practicing this invention. The wireless communication system 100 includes at least one mobile station (MS) 110, also referred to herein as a mobile terminal such as a cellular telephone or a PDA having wireless communication capabilities. The mobile station 110 typically includes a control unit or control logic, such as a microcontrol unit (MCU) 120 having an output coupled to an input of a display 140 and an input coupled to an output of a keyboard or keypad 160.

The MCU 120 is assumed to include or be coupled to some type of a memory 130, including, for the purposes of this invention, permanent memory 130A for storing at least an original version of an editable object, and working memory 130B for storing at least an editable instance of the editable object, a non-volatile memory for storing a computer program 135 and other information, as well as a volatile memory for temporarily storing required data, scratchpad memory, received packet data, packet data to be transmitted, and the like. The computer program is assumed, for the purposes of this invention, to enable the MCU 120 to execute the software routines, layers and protocols required to implement the methods in accordance with this invention, as well as to provide a suitable user interface (UI), via display 140 and keypad 160, with a user. Although not shown, a microphone and speaker may be provided for enabling the user to conduct voice calls in a conventional manner.

The mobile station 110 also contains a wireless section that includes a digital signal processor (DSP) 180, or equivalent high speed processor or logic, as well as a wireless transceiver that includes a transmitter 185 and a receiver 190, both of which are coupled to an antenna 195 for communication with a wireless network. Data, such as digitized voice and packet data, is transmitted and received through the antenna 195.

For the purposes of this invention an editable object is or includes data to be edited or viewed by more than one user. The source of the editable object can be remote (e.g. received from an image archive via the Internet), or it could be local (e.g. obtained from an image capture device or a camera that is part of the mobile station 110, or that is coupled to the mobile station 110). An original editable object may also be composed at one of the mobile stations 110.

Figure 2:
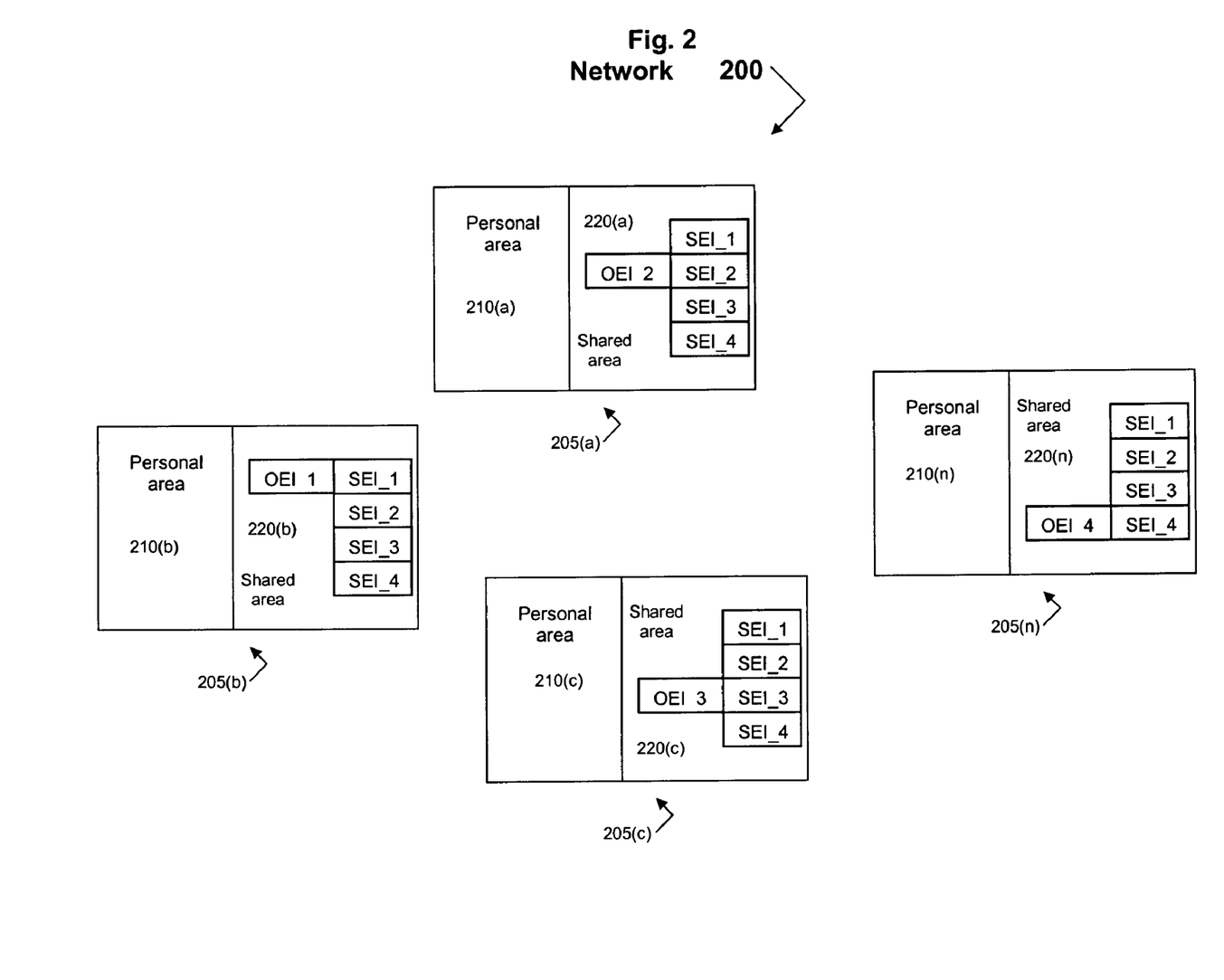
FIG. 2 is a simplified block diagram of a network, according to the present invention.

FIG. 2 shows a system, according to the present invention, having N terminals 205(a) ... (n), generally 205, connected to a network 200 (preferably wireless). Each terminal 205 is logically divided into a "personal" area 210(*a*) . . . (*n*), generally 210, and a "shared" area 220(*a*) . . . (*n*), generally 220. The user's Own Edited Instance (OEI_k), has the edit commands only. The other users' Shared Edited Instances (SEI_j), also have edit commands only. Any information in the shared area 220 is automatically synchronized between all users. The shared area 220 of user k has N entities. Since for each user the SEI_k corresponds to the user's own OEI_k, this SEI_k in is principle redundant; therefore, it may be either left blank, or contain a pointer to the OEI_k, or simply be a copy of the OEI_k. The choice of this presentation is not meant to limit the invention and in the description that follows, it is assumed to simply be a copy of OEI_k.

In a user's personal area 210, there can be any number of edited instances. However, these are only shared when the user "downloads" the version as his OEI. Immediately, the edit commands used to create the OEI are shared with all other users. In a preferred embodiment, all of the users' terminals 205 show whenever changes have been made (e.g. by changing the icon of the SEI). Any of the SEI can be downloaded from the user's shared area 220 to his personal area 210.

Figure 3:
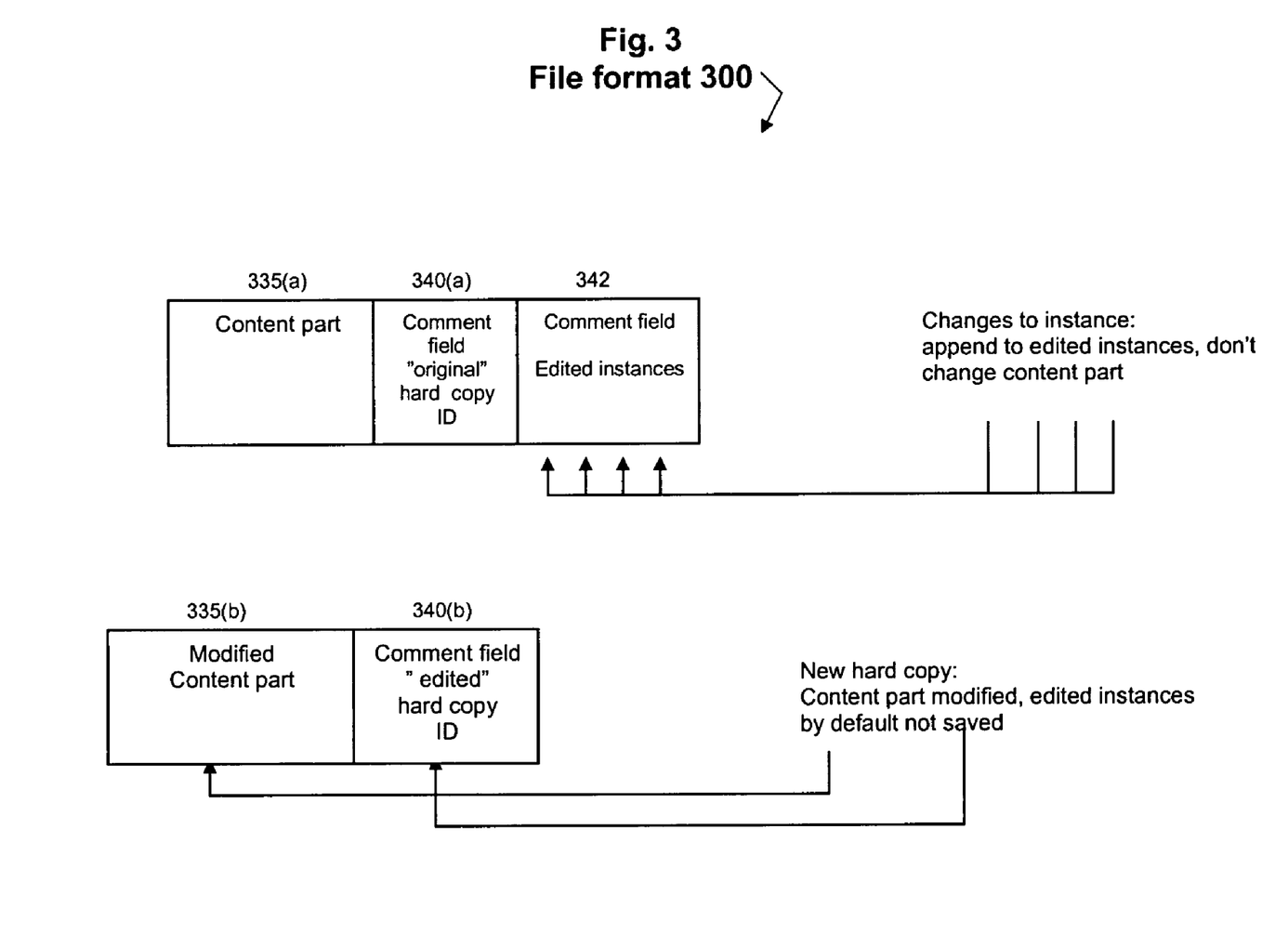
FIG. 3 is a simplified block diagram of the file format, according to the present invention.

FIG. 3 shows the file format for the editable object. Every editable object is considered to contain at least two parts: a "content part" 335(*a*), and at least one "comment field" 340(*a*). In a preferred embodiment, there is at least one comment field 340(*a*), 342. The first comment field 340(*a*) is designated the "original" hard copy ID field. Another comment field 342 is designated an "edited instances" field. Whenever the contents of the "content part" 335(*a*) are modified in any way a modified content part 335(*b*) is created, a new hard copy is formed and tagged with a new ID, and the original hard copy ID field 340(*a*) is changed to an "edited" hard copy ID field 340(*b*).

There can, however, be a large number of "edited instances" 342 of a given hard copy. Each edited instance 342 also has a unique ID, generally 340, associated with it, marking the time of creation (and possibly other ambient data). The edited instances 342 may be either separate files, or appended to the hard copy if the format supports comment fields.

Figure 4:
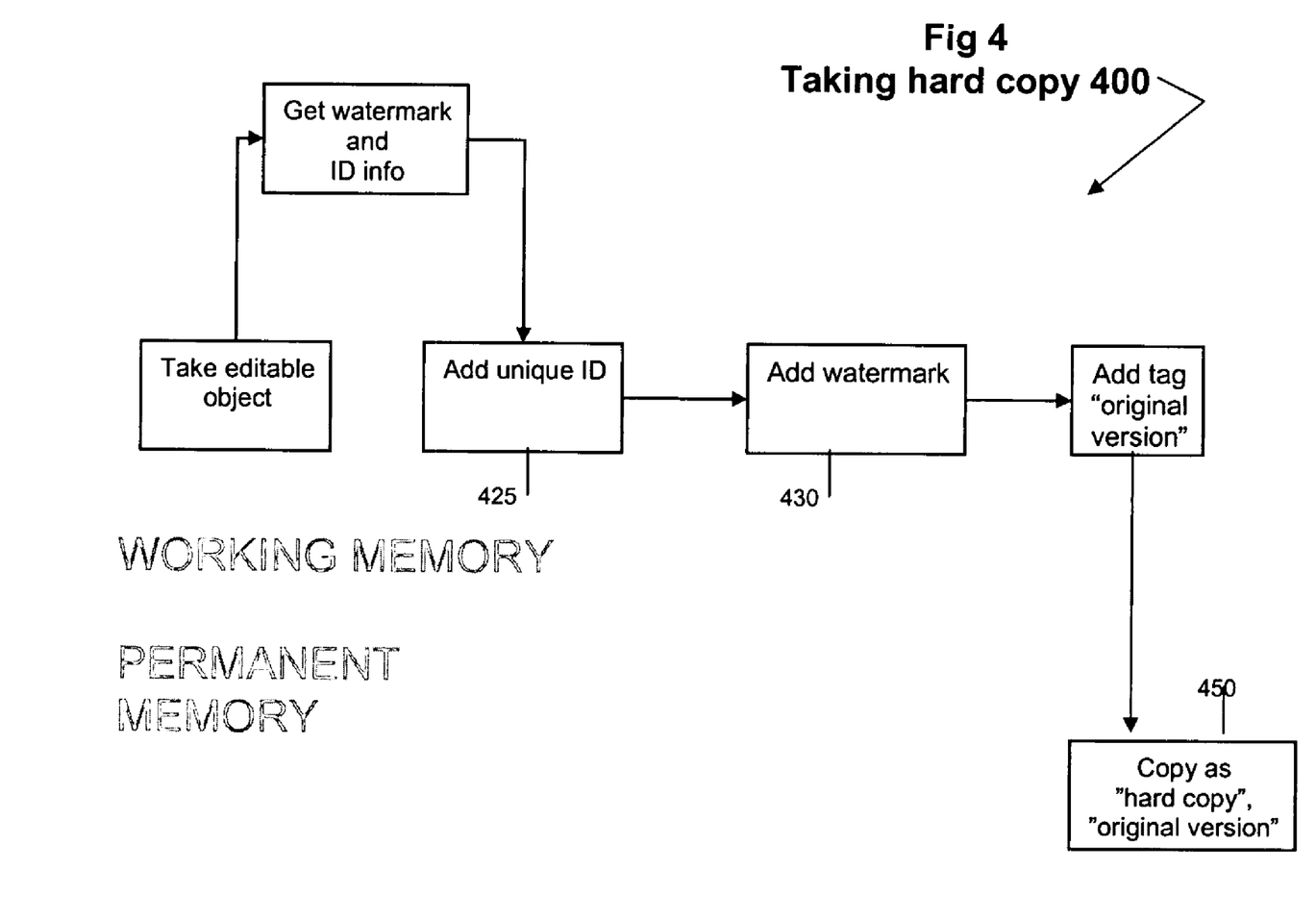
FIG. 4 is a flow chart showing the process of taking a hard copy of an editable object, according to the present invention.

FIG. 4 shows the process of taking a hard copy of the editable object by the mobile terminals. The "hard copy" is the original version of the editable object 450, after it has been processed by the basic editable object algorithms and stored in permanent memory. Preferably, a unique ID 425 and watermark 430 of some type is added at this point to authenticate the hard copy 450.

Figure 5:
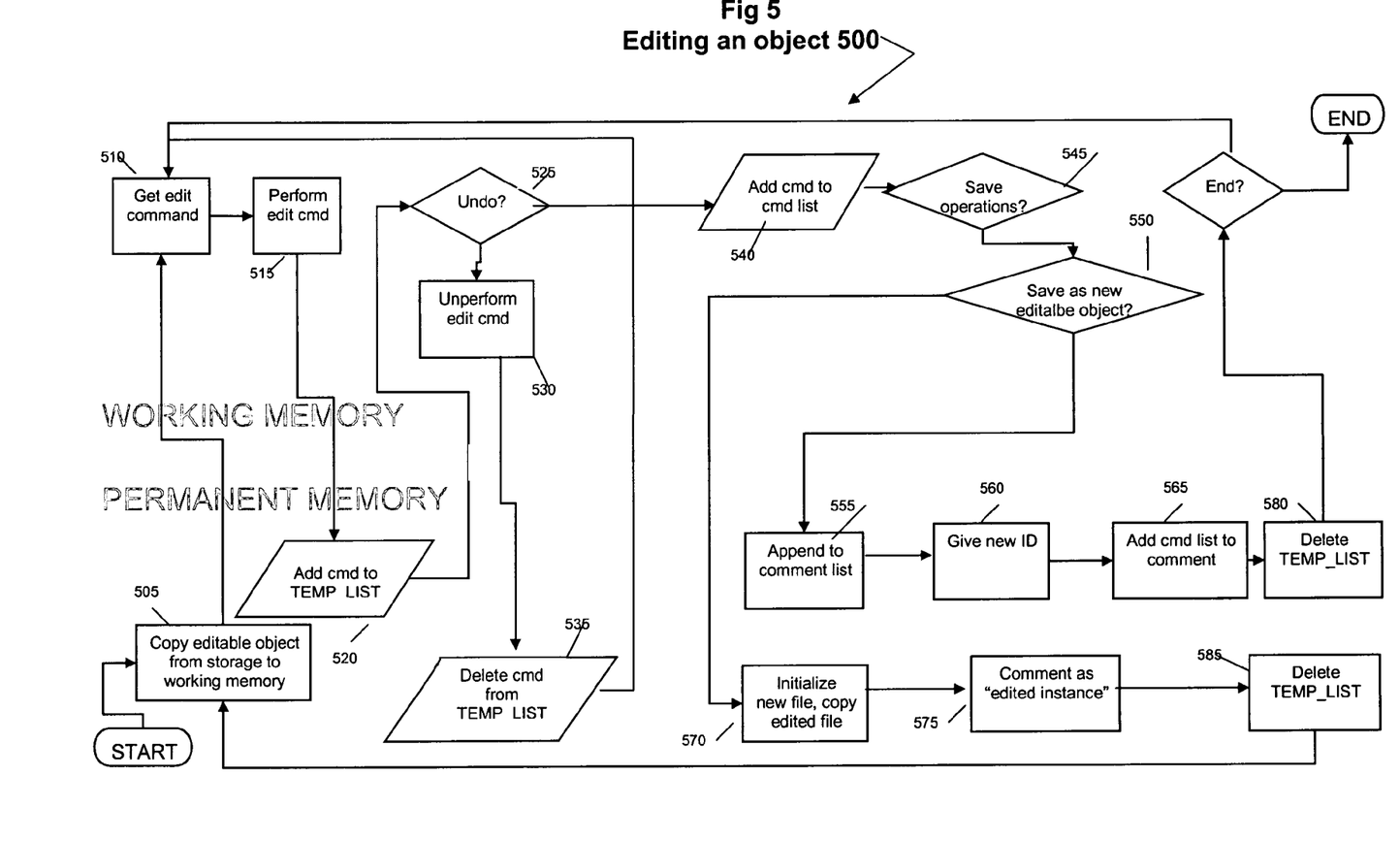
FIG. 5 is a flow chart showing the process for editing the editable object, according to the present invention.

FIG. 5 shows the process of editing the editable object. When the editing session begins, the hard copy of the editable object is copied from a user's permanent memory to working memory 505 and is sent to all of the users so that each user has an identical copy available for editing. There is only one hard copy. Each mobile terminal now contains a copy of the editable object. Each mobile terminal also has a list of the mobile terminals own edit commands and a list of the other mobile terminals edit commands 510. Only the edit commands, which can be compressed, are moving on the network 200 and each user can copy another user's edit commands to his mobile terminal if he wishes to. The individual user decides if he wants to implement the edit commands from others 515. If the edit commands of others are implemented, the commands are added 520 to a TEMP_LIST in permanent memory. If the user later decides to discard or reject these changes 525, the changes are removed 530, and the commands are deleted 535 from the TEMP_LIST in permanent memory. At this point new additional edit commands may be received from other users which may or may not be implemented at the request of the user. This process may continue until all users have completed editing.

When edit commands have been selected for implementation, the edit commands are added to a command list 540 and the changes are saved to the mobile terminal 545, 550. At this point the editable object is moved from working memory back to permanent memory. The user can then make various decision related to the editable object. The user can append it to a comment list 555, give it a new ID 560, add the command list to a comment field 565, initialize it as a new file or a copy of an edited file 570, indicate that it is an edited instance 575 and delete the TEMP_LIST 580, 585.

The process may end at this point or continue from the beginning at the behest of the individual users.

The algorithm language for editing an editable object is equipped to handle at a minimum the following commands (time starts from the beginning of the editable object):

"Show editable object from time1 to time2"

"Let editable object1=time1:time2; let editable object2=time3:time4; show editable object2, editable object1"

"Take still image at time1"

"Save as new instance"

"Save as new hard copy"

In practice, the use of audio overlays and deletions are also within the scope of this invention, such as:

"Silence from time1:time2"

"Overlay time1:time2 with audio_object at 50% of ambient volume"

"Replace audio from time1:time2 with audio_object"

The invention is not limited to the enumerated commands, as additional commands may also be incorporated, including commands for color manipulation and other editing features known to those skilled in the art.

JPEG2000 is presently preferred to implement the invention as it has 60 kB for comment fields defined. JPEG2000 allows for at least one comment to be included, in any format, as part of the algorithm language. However, it should be appreciated that this invention can, in principle, be implemented in any future or existing hardware/software platform with sufficient capacity for rudimentary editing and a connection to a network. Any wireless network protocol can be used to transfer the edit commands (Bluetooth, WLAN, etc.). Also, this invention may be implemented using MPEG or any other multimedia description format. As such, the teachings of this invention are not limited for use with any one particular data representation format or standard.

Figure 6A:
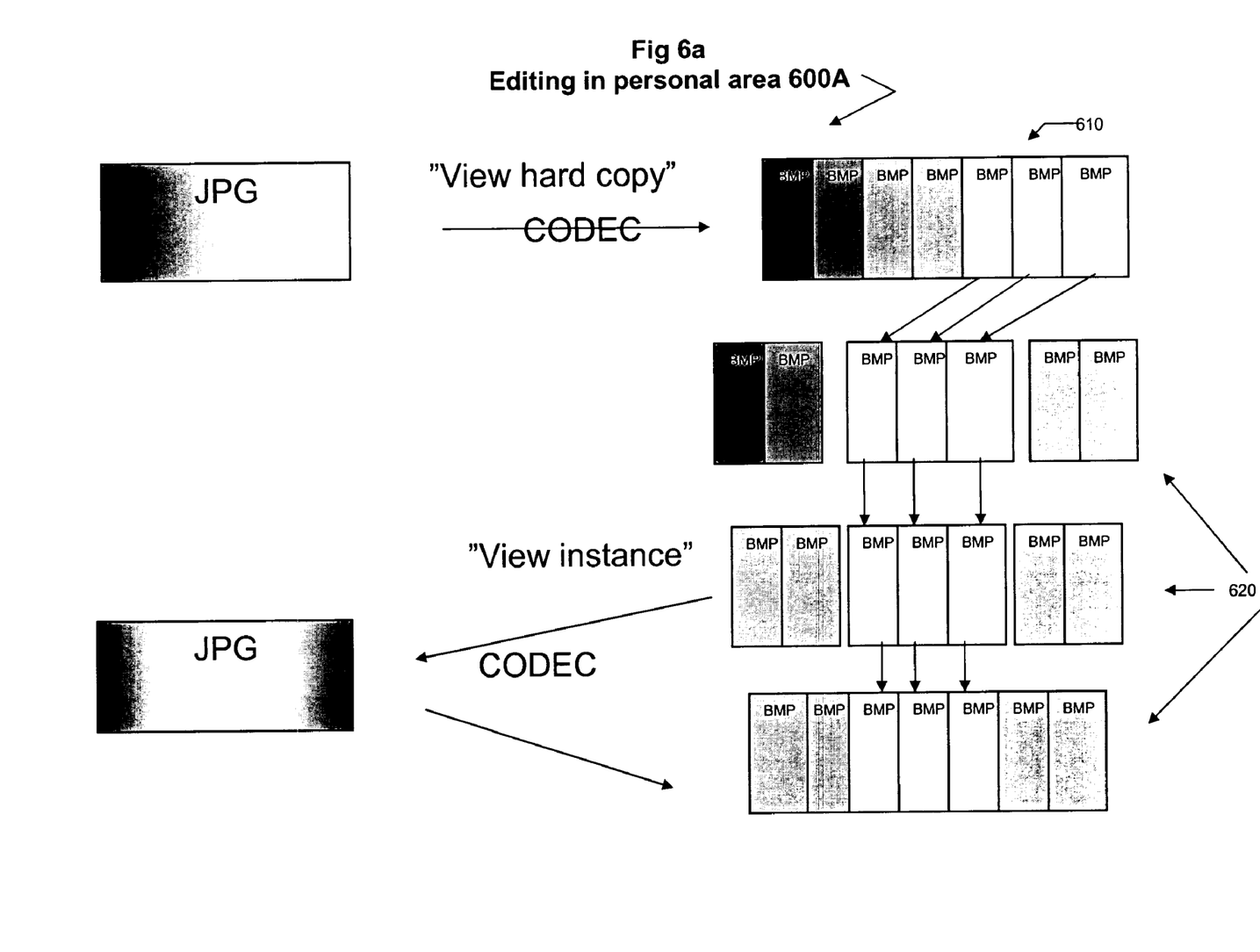
FIG. 6a is a simplified block diagram of the process for editing the editable object in a personal area, according to the present invention.

FIG. 6*a* shows the process of editing an editable object in the personal area of one's mobile terminal. Editable objects are considered to consist of a "hard copy" 610 and several "edited instances" 620. A hard copy or original editable object is viewed in the personal area. A portion of the editable object is cut from the end of the editable object and inserted back into the editable object in a new location. The edited instance remains in the personal area, separate from the hard copy. In the particular embodiment shown, the JPEG is converted into successive bitmaps and the order and characteristics of the bitmaps can be changed, and finally converted back into JPEG. Other embodiments using other formats and command structures are equally possible, provided they enable the types of "editing" required of the system as described above.

Figure 6B:
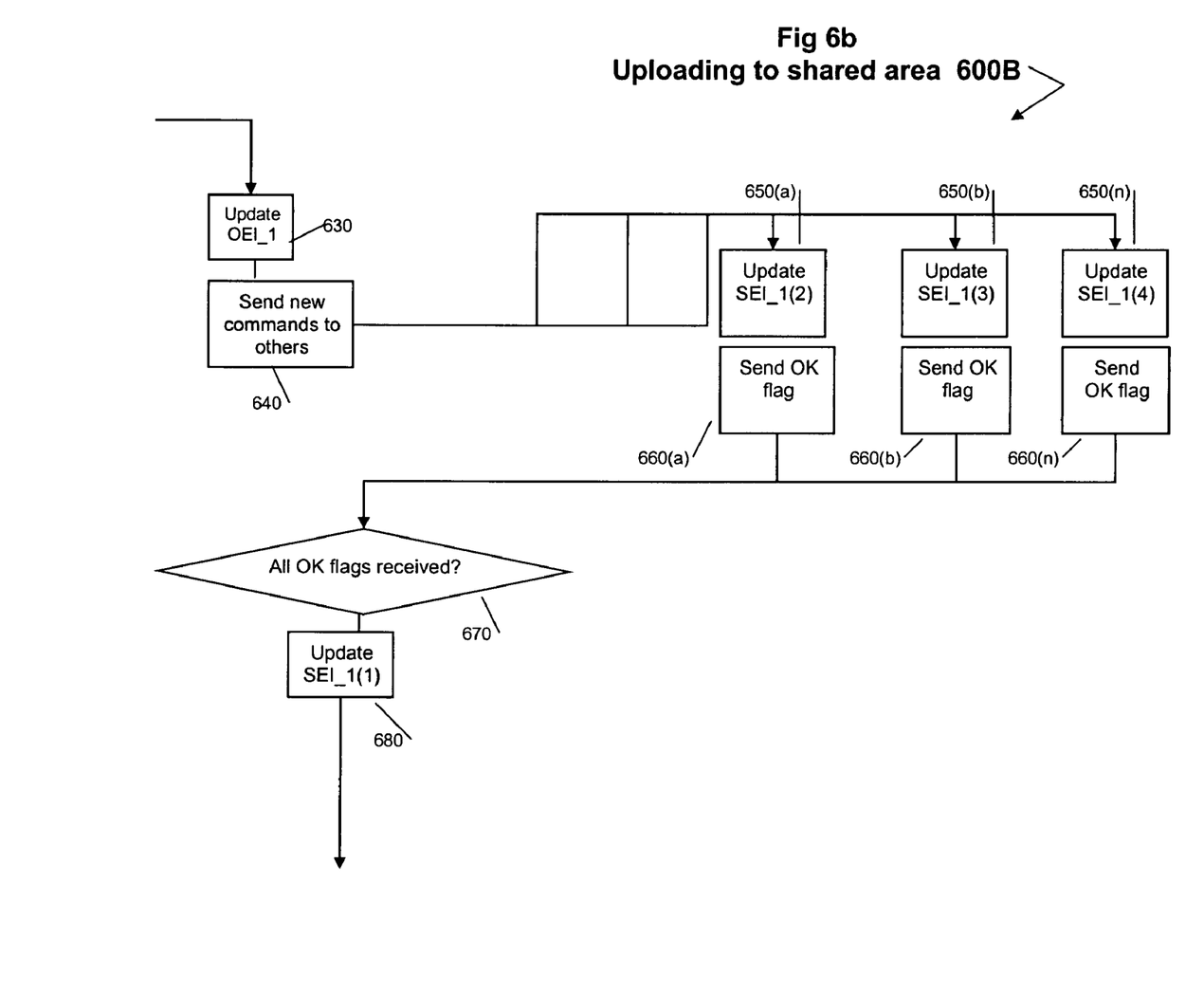
FIG. 6b is a flow chart of the process for uploading the editable object to a shared area, according to the present invention.

FIG. 6b shows the process of uploading an editable object to the shared area. User1 updates his Own Edited Instance 630 in the shared area and sends new commands to other users 640. The other users mobile terminals update their Shared Edited Instances 650(*a*) . . . (*n*), generally 650, and return a flag 660(*a*) . . . (*n*), generally 660, back to user1. Upon notification 670 that the other users' mobile terminals have updated their Shared Edited Instances, user1's Shared Edited Instance is updated 680.

One feature of this invention is that synchronization problems are overcome. This is true because all decisions are left to the users, who may accept or reject each others' ideas at will. This in turn is possible because of the logical separation between the hard copy, edited instances, and edit commands; given another user's edit commands, it is always possible to generate the wanted edited instance from the hard copy and edit commands. An individual user can, for example, choose to adopt another user's SEI_j as his OEI_k. The SEI_j is then overwritten into the OEI_k (and optionally SEI_k is updated). Within some limitations, it is also possible to copy only individual edit commands from another user's SEI_j. In the simplest case, commands that define e.g. visual contrast for the entire editable object can be copied, as is. In cases where a command applies only to a given editable object cut from the hard copy (e.g. from time1: time2), it is also necessary to copy the commands that were used to create that editable object.

It is also within the scope of the present invention to use "control bits" or other types of short, fast small data exchange means for conveying contextual updates and information to the users. These contextual updates may provide information to the other users as to who is working on a particular editable object. The contextual updates also provide information to the users regarding which part of an editable object each user is working on in order to potentially divide the work, as the portion of the editable object that is being worked on is indicated to others by sending this information using the control bits. After receiving these control bits, the display (using small tags) indicates who is editing and which parts of the editable object are being edited, allowing for more coordinated work between the users. The control bits thus also provide information to the users regarding the status of the complete work. It is also possible, within the present invention, to control who is allowed to join an editing session. In this embodiment, only after editing is complete are the editing commands sent to everyone. The optional contextual update information can thus be seen to function so as to provide coordination, control and status for the group editing process.

Potential applications of the invention include writing up plans for a map or similar usage, group editing (fun feature), group editing (quicker usage by collaboration), music loop, or image and music data, competitive editing and application using greeting card metaphor (everyone sends own clip).

However, all such and similar modifications of the teachings of this invention will still fall within the scope of this invention, for example, although descriptive content of certain data fields are illustrated, these are not intended to be exhaustive of combinations comprising data fields. Further, while the method and apparatus described herein are provided with a certain degree of specificity, the present invention could be implemented with either greater or lesser specificity, depending on the needs of the user. Further, some of the features of the present invention could be used to advantage without the corresponding use of other features. As such, the foregoing description should be considered as merely illustrative of the principles of the present invention, and not in limitation thereof, as this invention is defined by the claims which follow.

What is claimed is:

1. A method to operate a plurality of mobile terminals, comprising:

storing an editable object in the plurality of mobile terminals, where a memory area of each of a plurality of mobile terminals further comprises a personal area and a shared area, the personal area being arranged to have multiple instances of the editable object, and simultaneously editing the editable object using the shared areas of the memory areas of at least some of the plurality of mobile terminals, where the mobile terminals that are used for editing the editable object send locally generated edit commands to other mobile terminals of the plurality of mobile terminals.

2. A method as in claim 1, where the memory area of the plurality of mobile terminals comprises a working memory area used during editing and a permanent storage memory area.

3. A method as in claim 1, where at least one of the plurality of mobile terminals initiates an editing process whereby information comprising at least one of a hard copy or edited instance is sent from at least one mobile terminal to at least one other of the plurality of mobile terminals.

4. A method as described in claim 3, where the information sent comprises the user's Own Edited Instance of the editable object.

5. A method as described in claim 3, where the information sent comprises other user's Shared Edited Instances.

6. A method as described in claim 3, where the information sent comprises a user's own editing commands.

7. A method as described in claim 3, where the information sent comprises other user's editing commands.

8. A method as described in claim 3, where the information sent comprises contextual control information.

9. A method as described in claim 8, where the contextual control information conveys user information.

10. A method as described in claim 1, where the information in the shared area is automatically synchronized between all users.

11. A method as described in claim 1, where the information in the personal area comprises at least one edited instance of the editable object.

12. A method as described in claim 1, where individual ones of the plurality of mobile terminals indicate when modifications have been made to the editable object.

13. A method as described in claim 1, where at least one of the shared edited instances is transferred from the user's shared area to the user's personal area.

14. A method as described in claim 1, where an editable object is considered to comprise at least two parts comprising:

a content part; and at least one comment field.

15. A method as described in claim 14, where a first comment field is designated a hard copy ID field.

16. A method as described in claim 15, where another comment field is designated an edited instance ID field.

17. A method as described in claim 15, wherein when the content of the content part is changed:

a hard copy is formed and tagged with an ID; and the hard copy ID field is changed.

18. A method as described in claim 1, where each edited instance has a unique ID associated with it.

19. A method as described in claim 1, where each edited instance is a file.

20. A method as described in claim 1, where each edited instance may be appended to a hard copy.

21. A method as described in claim 1, where there is only one hard copy of the editable object.

22. A method as described in claim 21, where the hard copy is the original version of the editable object.

23. A computer readable medium encoded with a computer program for directing a computer to execute a method that comprises: storing an editable object in a mobile terminal that is a member of a set of mobile terminals; editing the editable object in the mobile terminal; and transmitting edit commands to other members of the set of mobile terminals, where the mobile terminal further comprises a memory area divided into a working memory area and a permanent storage memory area, further logically divided into a personal area and a shared area, where information in the personal area includes at least one edited instance of the editable object.

24. A mobile terminal, comprising a wireless transceiver, a data processor, and a memory for use in storing an editable object, editing the editable object and transmitting, via the wireless transceiver, edit commands to other members of a set of mobile terminals that also store and edit the same editable object, where the mobile terminal further comprises a memory area divided into a working memory area and a permanent storage memory area, further logically divided into a personal area and a shared area, where information in the personal area includes at least one edited instance of the editable object.

25. A wireless communication system comprising a plurality of mobile terminals at least one comprising means for editing an editable object and for transmitting information that comprises edit commands, via the wireless communications system, to others of the plurality of mobile terminals for implementing collaborative editing of said editable object, where the mobile terminal further comprises a memory area divided into a working memory area and a permanent storage memory area, further logically divided into a personal area and a shared area, where information in the personal area includes at least one edited instance of the editable object.

26. A wireless communication system as described in claim 25, where the information further comprises a user's Own Edited Instance.

27. A wireless communication system as described in claim 25, where the information further comprises other user's Shared Edited Instances.

28. A wireless communication system as described in claim 25, where the information further comprises other user's editing commands.

29. A wireless communication system as described in claim 25, where the information further comprises contextual information to convey coordination, control and status information regarding the collaborative editing of the editable object.

30. A wireless communication system as described in claim 25, where the editable object comprises image data.

31. A wireless communication system as described in claim 30, where the editable object further comprises audio data.

32. A wireless communication system as described in claim 25, where information in the shared area is automatically synchronized between all users.

33. A wireless communication system as described in claim 25, where the plurality of mobile terminals indicate via the wireless communication system when modifications have been made to the editable object.

34. A wireless communication system as described in claim 25, where at least one of the shared edited instances is downloaded from the user's shared area to the user's personal area.

35. A wireless communication system as described in claim 25, where each editable object comprises at least a content part and at least one comment field.

36. A wireless communication system as described in claim 35, where a first comment field is designated a hard copy ID field.

37. A wireless communication system as described in claim 36, where another comment field is designated an edited instance ID field.

38. A wireless communication system as described in claim 37, wherein when the contents of the content part is changed a hard copy is formed and tagged with an ID and the hard copy ID field is changed.

39. A wireless communication system as described in claim 25, where each edited instance has a unique ID associated with it.

40. A wireless communication system as described in claim 25, where each edited instance is a separate file.

41. A wireless communication system as described in claim 25, where each edited instance is appended to a hard copy of the editable object.

42. A wireless communication system as described in claim 41, where there is only one hard copy of the editable object.

43. A wireless communication system as described in claim 42, where the hard copy is an original version of the editable object.

44. A wireless communication system as described in claim 25, where the information comprises a user's Own Edited Instance and at least one other user's Shared Edit Instances.

45. A wireless communication system as described in claim 43, where the hard copy includes a watermark.

46. A method as in claim 1, where each mobile terminal of the plurality of mobile terminals maintains a list of its own edit commands and a list of edit commands of other ones of the plurality of mobile devices.

47. A wireless communication system as described in claim 25, where each mobile terminal of the plurality of mobile terminals maintains a list of its own edit commands and a list of edit commands of other ones of the plurality of mobile devices.

48. A wireless communication system as described in claim 25, wherein the editable object is an editable video object.

49. A wireless communication system as described in claim 25, wherein the editable object is sourced from an image archive via the Internet.

50. A wireless communication system as described in claim 25, wherein the editable object is sourced by an image capture device.

51. A wireless communication system as described in claim 25, wherein the editable object is sourced by a camera.

52. A computer program as described in claim 23, wherein the editable object is an editable video object.

53. A mobile terminal as described in claim 24, wherein the editable object is an editable video object.

54. A computer program as described in claim 23, wherein the editable object is an editable image object.

55. A mobile terminal as described in claim 24, wherein the editable object is an editable image object.

56. A method as in claim 1, further comprising utilizing control bits for each mobile terminal of the plurality of mobile terminals to provide contextual updates to other ones of the plurality of mobile devices.

57. A method as in claim 1, where the editable object is an editable video object.

58. A computer program as described in claim 23, where each mobile terminal of the set of mobile terminals maintains a list of its own edit commands and a list of edit commands of other ones of the set of mobile devices.

59. A mobile terminal as in claim 24, where each mobile terminal of the set of mobile terminals maintains a list of its own edit commands and a list of edit commands of other ones of the set of mobile devices.

60. A wireless communication system as described in claim 25, where each one of the plurality of mobile terminals comprises means for editing an editable object and for transmitting information that comprises edit commands, via the wireless communications system, to others of the plurality of mobile terminals for implementing collaborative editing of said editable object.

* * * * *